Nov. 30, 1954 N. K. ANDERSON 2,695,687
MAGNETIC FRICTION DEVICE WITH REPLACEABLE FRICTION FACE
Filed July 2, 1952 2 Sheets-Sheet 1
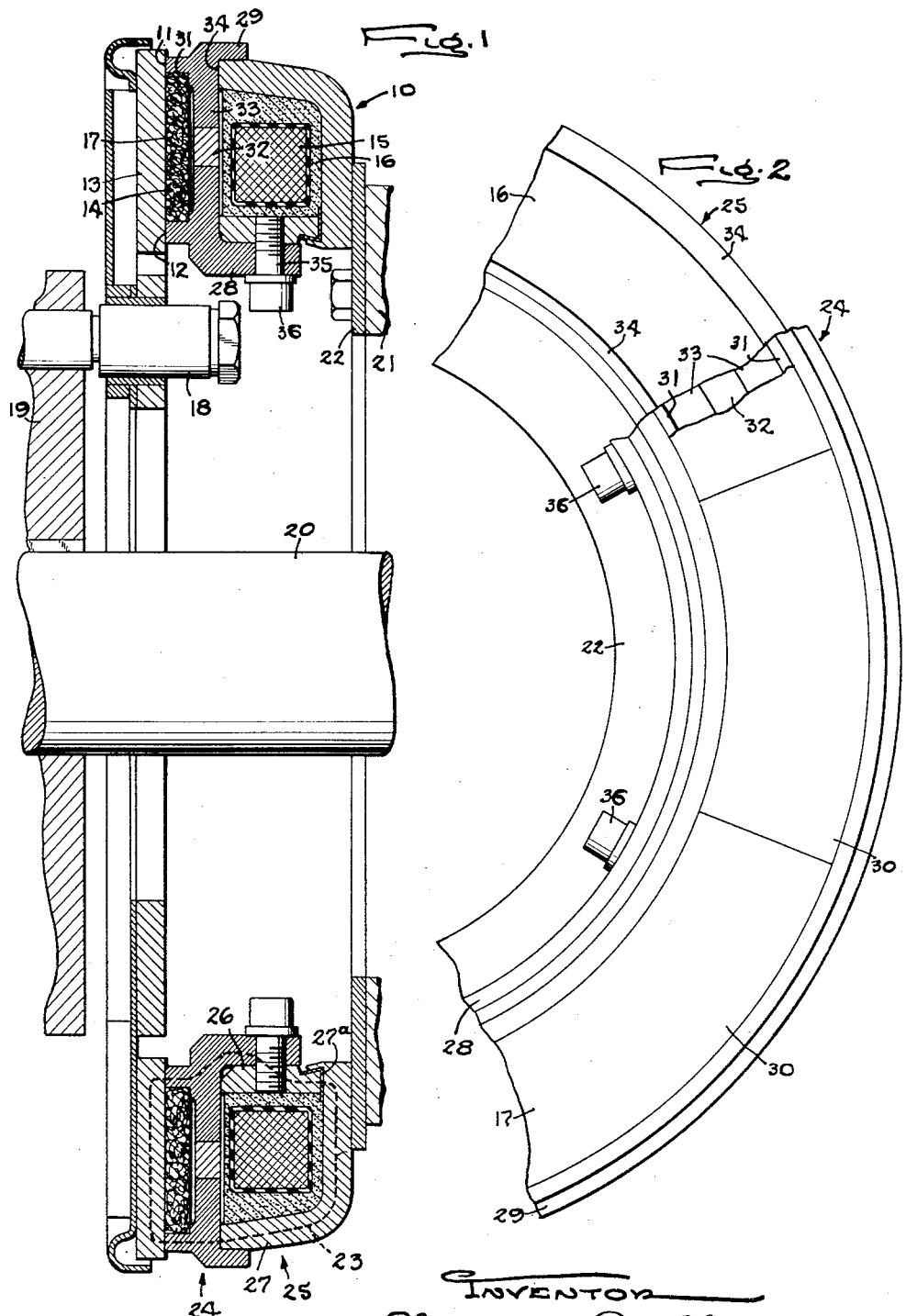

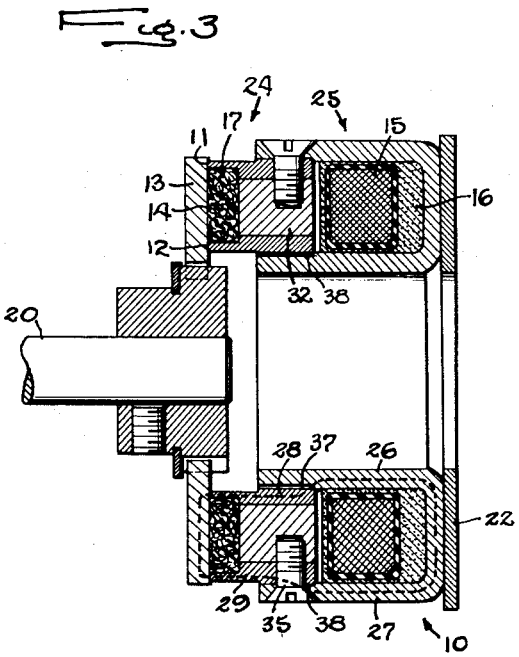

2,695,687

MAGNETIC FRICTION DEVICE WITH REPLACEABLE FRICTION FACE

Norman K. Anderson, Beloit, Wis., assignor to Warner Electric Brake & Clutch Company, South Beloit, Ill., a corporation of Illinois Application July 2, 1952, Serial No. 296,969

5 Claims. (Cl. 188—164)

This invention relates to magnetic friction devices of the type comprising an annular magnet having concentric pole pieces terminating in pole faces which, together with an annular wear plate disposed between the rings, form a friction face adapted for axial gripping engagement with a flat armature ring.

The general object is to provide in a friction device of the above character a magnet constructed in a novel manner to permit ready replacement of those parts which are subject to wear.

A more detailed object is to form the magnet in two rigid parts, one of which includes the pole faces and the wear plate and constitutes a replaceable friction face unit detachably mounted on the other or permanent part of the magnet.

Another object is to retain the usual U-shaped cross-section of the magnet core and to form the rigid replaceable unit with ring-like portions which telescope closely with and may be secured rigidly to the concentric portions of the core.

Other objects and advantages of the invention will become apparent from the following detailed description taken in connection with the accompanying drawings, in which Figure 1 is a diametrical cross sectional view of a friction device embodying the novel features of the present invention.

Fig. 2 is a fragmentary face view with parts broken away of the magnet.

Fig. 3 is a view similar to Fig. 1 illustrating a modified form of the invention.

In the drawings, the invention is shown for purposes of illustration embodied in an electromagnetic friction brake comprising a magnet 10 providing a pair of annular axially facing pole faces 11 and 12 concentric with other and bridged by an armature 13. The latter is rotatable relative to the magnet and is adapted for axial gripping engagement with the friction face 14 of the magnet. Herein the magnet is generally U-shaped in cross section, and a coil 15 is disposed within the U and secured in place by a hardened filling 16. An annular wear plate 17 of nonmagnetic friction material such as brake lining is seated between and secured to the pole pieces with its outer surface flush with the pole faces thereby forming the composite friction face 14.

In the form shown, the armature 13 comprises a flat ring of magnetic material spanning the pole faces 11 and 12 of the magnet 10 and, in this instance, supported for axial movement on a plurality of pins 18 angularly spaced around a supporting member 19 which herein is keyed to a rotatable shaft 20. If the friction device is to be used as a brake, the magnet 10 is mounted stationarily on a member 21. This may be accomplished through the medium of the plate 22 screwed to the member 21 and fastened, as by welding, to the back of the magnet.

When the coil 15 is energized, magnetic flux will thread the substantially closed circuit (shown by the broken line 23 in Fig. 1) through the magnet 10 and the armature 13 and around the coil, the armature thus being drawn into axial gripping engagement with the friction face 14 of the magnet. The elements, when engaged, will apply a torque of a magnitude determined by the degree of energization of the coil. During service use, the friction face 14 wears off, and it has been necessary heretofore to then remove the entire magnet assembly and to replace it by another complete magnet assembly even though parts of the assembly such as the coil 15 and part of the magnet core are not damaged.

To reduce the number of parts which must be replaced thereby reducing the cost of providing a new friction face, the present invention contemplates dividing each of the two concentric pole pieces of the magnet core into two cylindrical parts which telescope closely with each other and are secured together detachably, the parts defining the pole faces 11 and 12 being joined together rigidly and forming with the wear plate 17 a unit 24 removably mounted on a coil-carrying or non-wearing part 25. Herein, the latter comprises the multiple turn winding 15 disposed within a two part magnetic ring 26, 27 of U-shaped cross section and secured therein by the hardened filling 16. If desired, the parts 26 and 27 may be separated but connected rigidly by a narrow gap 27ᵃ of non-magnetic material for dissipating residual magnetism when the coil is deenergized.

In the present instance, the friction face part or unit 24 comprises two concentric rings 28 and 29 rigidly connected to but magnetically separated from each other and forming inner and outer pole pieces which terminate in the pole faces 11 and 12. Segments 30 (Fig. 2) of wear material constituting the wear plate 17 are disposed between the pole piece rings 28 and 29 and are backed by shoulders 31 on the rings with the outer surfaces of the segments flush with the pole faces. Preferably, the rigid connection of the pole pieces 28 and 29 is effected by a flat narrow ring 32 of copper or other nonmagnetic material suitably secured as by brazing to radial flanges 33 on the pole piece rings.

To mount the wear face unit 24 on the magnet part 25, the inner and outer pole piece rings 28 and 29 telescope respectively with the inner and outer rings 26 and 27. Herein the flange 33 of each pole piece is disposed against the end face 34 of the corresponding magnet ring and the outer pole piece 29 projects axially along the outside of the outer ring 27 while the inner pole piece 28 telescopes within the inner ring 26. The mating surfaces of the rings and the pole pieces are machined and sized to fit closely in metal to metal contact to minimize the air gaps in the path 23 of the coil flux. In the form shown in the drawings, the inner pole piece is longer than the outer pole piece and overlaps the major portion of the inner ring 26 to afford ample width for receiving a plurality of angularly spaced screws 35 by which the units 24 and 25 are secured together. The screws project radially through only the inner pole piece and are threaded into the inner ring while leaving the heads 36 exposed around the inner periphery of the composite magnet ring.

With the foregoing arrangement, the flux of the coil 15 threads a path through the inner ring 26, the inner pole piece 28, the armature 13, the outer pole piece 29 and the outer ring 27 as shown by the broken line 23. During service use of the brake, the pole faces 11 and 12 and the outer surface of the wear plate 17 wear off and eventually the friction face 14 is no longer serviceable. At such time, the screws 35 are removed permitting the friction face unit 24 to be slid axially off from the permanent part 25. A new friction face unit then is mounted on the magnet part and fastened to the latter by the screws to provide a new wear surface.

The magnet rings 26 and 27 and the coil 15, which are not subjected to wear, are used again while only the parts constituting the friction face 14 need be changed. A substantial reduction in the replacement cost of a new friction face is thus achieved.

Fig. 3 shows a modification in which the parts common to the form first described are indicated by corresponding reference numerals. In this modification, the annular pole piece rings 28 and 29 project in between the rings 26 and 27 of the magnet part 25. To this end, the magnet rings extend outwardly beyond the coil 15 and, adjacent the hardened filling 16, are formed with annular shoulders 38 against which the inner ends of the pole pieces abut. The latter are longer axially in this case so that their inner ends may be received between the magnet rings while their pole faces 11 and 12 and the outer surface of the wear plate 17 are disposed beyond the outer ends of the rings of the magnet to provide the friction face 14. Between the pole pieces and behind the wear plate is a ring 32 of nonmagnetic material such as copper fused to the pole pieces and extending inwardly to the inner ends of the latter. The copper ring magnetically separates the pole pieces and also joins them rigidly together to form the replaceable unit 24.

In the present instance, advantage is taken of the two part construction of the magnet 10 to provide a gap 37 for dissipating residual magnetism when the coil is de-energized. For this purpose, the outer pole piece 29 is machined and sized to fit snugly within the outer magnet ring 27 while the inner pole piece 28 and the inner ring 26 are spaced apart radially to leave the narrow gap 37 which thus is disposed in the path 23 of the flux. In this way, the rings 26 and 27 may be formed by a single U-shaped piece.

To hold the replaceable wear face unit 24 in place on the permanent part 25 of the magnet 10, a plurality of screws 35 project through the outer ring 27 and are threaded into the outer pole piece 29, with their heads countersunk in the ring 27. To insure proper rigidity of the connection between the magnet core and the pole rings in spite of the presence of the gap 37, it is preferred to extend the screws well into the copper filling 32 and to back the inner ring to some degree by the inner shoulder 38.

When the coil 15 is energized, the flux threads a path 23 through the outer pole piece 29 and the rings 27 and 26, across the gap 37 and through the inner pole piece 28 and the armature 13. As in the previous case, the magnet 10 may be provided with a new friction face 14 simply by removing the screws 35 and replacing the worn out friction face unit 24 with a new unit.

I claim as my invention:

1. In a torque producing device, the combination of, an annular channel constituting a magnetic core of U-shaped radial section and having two generally cylindrical pole projections concentric with each other and the core axis, an annular multiple turn winding disposed within said core between said projections, two magnetic pole rings providing at one of their ends radially spaced pole faces lying substantially in a common plane, the opposite end portions respectively telescoping with said pole projections to form with said core a low reluctance connection extending around said winding from one pole face to the other, a layer of wear resistant friction material disposed between and fixed relative to the outer ends of said rings and having an outer surface substantially flush with said pole faces, a nonmagnetic connection axially spaced inwardly from said pole faces and rigidly joining said rings to constitute the rings, the connection and said wear layer a single rigid unit removable from said core, and removable fastening means rigidly joining one of said rings and the adjacent pole projection to lock the two positively against relative displacement while permitting ready removal and replacement of the unit.

2. In a torque producing device, the combination of, an annular channel constituting a magnetic core of U-shaped radial section and having two generally cylindrical pole projections concentric with each other and the core axis, an annular multiple turn winding disposed within said core between said projections, two magnetic pole rings having inner end portions closely fitting against said pole projections and providing at their outer ends pole faces lying substantially in a common plane, a rigid nonmagnetic connection rigidly joining said rings and axially spaced inwardly from said faces to form an outwardly opening annular recess between said outer ring ends, a layer of wear resistant friction material fixedly seated in said recess against the bottom of the latter with the outer surface of the layer substantially flush with said pole faces, and means detachably fastening one of said rings and the adjacent pole projection rigidly together to lock the same against relative displacement, said rings, said wear layer, and said connection constituting a rigid assembly removable as a unit from said core upon release of said fastening means.

3. In a torque producing device, the combination of, an annular channel constituting a magnetic core of U-shaped radial section and having two cylindrical pole projections concentric with each other and the core axis, an annular multiple turn winding disposed within said core between said projections, an outer magnetic pole ring abutting against the end of the outer pole projection and having an end portion overlapping and closely telescoping with the latter projection, the opposite end portion of the ring terminating in a pole face, a second magnetic ring abutting against the end of the inner pole projection and having an end portion overlapping and closely telescoping with the latter projection, the outer end of said second ring constituting a pole face substantially flush with said first pole face, shoulders on the adjacent sides of said rings facing outwardly toward said pole faces and axially spaced inwardly therefrom, a layer of wear resistant friction material disposed between said rings and fixedly seated against and backed by said shoulders, the outer surface of said layer being substantially flush with said pole faces, a nonmagnetic connection disposed beneath said friction layer and rigidly joining said rings to constitute the rings, the connection and said wear layer a single rigid unit removable from said core, and a plurality of angularly spaced removable fastening elements extending radially into the overlapping portions of one of said projections and rings and rigidly and positively locking said unit and core together against relative displacement.

4. In a torque producing device, the combination of, an integral annular channel constituting a magnetic core of U-shaped radial section and having two cylindrical pole projections concentric with each other and with the core axis, an annular multiple turn winding disposed within said core between said projections, a magnetic pole ring having one end portion telescoping closely with one of said pole projections and providing at its outer end a pole face, a second magnetic ring having one end portion loosely telescoping with the other of said pole projections so as to provide a narrow nonmagnetic restriction between the overlapping surfaces, the outer end of said second ring constituting a pole face substantially flush with said first pole face, a layer of wear resistant friction material disposed between and backed by said rings and having an outer surface substantially flush with said pole faces, a nonmagnetic connection disposed beneath said friction layer and rigidly joining said rings to constitute the rings, the connection and said wear layer a single rigid unit removable from said core, and removable fastening means rigidly locking said core and said unit together against relative displacement but releasable to permit quick removal of the unit from said core and the substitution of a similar unit thereon.

5. In a torque producing device, the combination of, an annular channel constituting a magnetic core of U-shaped radial section and having two cylindrical pole projections concentric with each other and the core axis, an annular multiple turn winding disposed within said core between said projections, two magnetic pole rings having outer ends terminating in pole faces substantially flush with each other and inner end portions respectively telescoping with said pole projections to form a low reluctance flux circuit through said core and around said winding from one pole face to the other, a layer of wear resistant friction material disposed between said rings and fixedly seated therebetween, the outer surface of said layer being substantially flush with said pole faces, a nonmagnetic connection beneath said friction layer axially spaced from said pole faces and rigidly joining said rings to constitute the rings, the connection and said wear layer a single rigid assembly removable as a unit from said core, and a plurality of removable fastening elements extending radially of the telescoped portions and rigidly but detachably joining said core and assembly together whereby to permit ready removal and replacement of the assembly.

References Cited in the file of this patent

UNITED STATES PATENTS

| Number | Name | Date |
|---|---|---|
| 600,941 | Arnold | Mar. 22, 1898 |
| 1,532,449 | Sederholm | Apr. 7, 1925 |
| 2,353,750 | Oetzel | July 18, 1944 |
| 2,549,214 | Lilja | Apr. 17, 1951 |